US008886629B2

(12) United States Patent
Bluhm

(10) Patent No.: US 8,886,629 B2
(45) Date of Patent: Nov. 11, 2014

(54) DISTRIBUTED SEARCH METHODS, ARCHITECTURES, SYSTEMS, AND SOFTWARE

(76) Inventor: Mark A. Bluhm, Cottage Grove, MN (US)

( * ) Notice: Subject to any disclaimer, the term of this patent is extended or adjusted under 35 U.S.C. 154(b) by 1207 days.

(21) Appl. No.: 10/832,094

(22) Filed: Apr. 26, 2004

(65) Prior Publication Data

US 2005/0004898 A1   Jan. 6, 2005

Related U.S. Application Data

(60) Provisional application No. 60/465,585, filed on Apr. 25, 2003.

(51) Int. Cl.
*G06F 7/00* (2006.01)
*G06F 17/30* (2006.01)

(52) U.S. Cl.
CPC ............................... *G06F 17/30864* (2013.01)
USPC .......................................... 707/708; 707/710

(58) Field of Classification Search
USPC ........................................ 707/100, 708, 710
See application file for complete search history.

(56) References Cited

U.S. PATENT DOCUMENTS

| 5,590,319 | A | | 12/1996 | Cohen et al. | |
|---|---|---|---|---|---|
| 5,987,446 | A | | 11/1999 | Corey et al. | |
| 6,009,422 | A | * | 12/1999 | Ciccarelli | 707/4 |
| 6,178,419 | B1 | * | 1/2001 | Legh-Smith et al. | 707/6 |
| 6,212,518 | B1 | * | 4/2001 | Yoshida et al. | 707/5 |
| 6,772,194 | B1 | * | 8/2004 | Goldschmidt | 709/203 |
| 6,976,018 | B2 | * | 12/2005 | Teng et al. | 1/1 |
| 7,010,546 | B1 | * | 3/2006 | Kolawa et al. | 707/103 R |
| 2002/0073005 | A1 | * | 6/2002 | Welnicki et al. | 705/35 |
| 2002/0143744 | A1 | | 10/2002 | Teng et al. | |
| 2002/0198869 | A1 | | 12/2002 | Barnett | |
| 2003/0225755 | A1 | * | 12/2003 | Iwayama et al. | 707/3 |
| 2004/0213437 | A1 | * | 10/2004 | Howard et al. | 382/115 |

FOREIGN PATENT DOCUMENTS

WO    WO-0079436 A2    12/2000
WO    WO-0079436 A2    12/2000

OTHER PUBLICATIONS

Java Message Service Overview, Jun. 2001.*
Websphere MQ Features and Benefits, Dec. 1998.*
"International Application Serial No. 200480017052.4, First Office Action mailed Nov. 9, 2007", 7 pgs.
Application Serial No. 04750667.0, Non-Final Office Action mailed Feb. 27, 2006, 7 pages.
Application Serial No. 543515, Non-Final Office Action mailed Mar. 23, 2007, 2 pages.
Application Serial No. P040101422, Non-Final Office Action mailed Jul. 12, 2005, 4 pages.

(Continued)

*Primary Examiner* — Mariela Reyes
(74) *Attorney, Agent, or Firm* — Valenti Hanley & Robinson, PLLC; Kevin T. Duncan

(57) ABSTRACT

Systems, methods, and software for providing a distributed search function for online delivery platforms used in law firms and other enterprises are described. For example, one aspect of the systems, methods and software provides a plurality of data sets. The data sets may comprise indices into other sets of data. At least one search engine is associated with each data set. A system receiving a search request determines which search engines are used to process the search request based on the data sets involved in the search request. The search request is then forwarded to the identified search engines.

27 Claims, 3 Drawing Sheets

(56) References Cited

OTHER PUBLICATIONS

European Application Serial No. 04750667.0-1527, EP Office Action mailed Aug. 23, 2007, 5 pgs.
Indian Application Serial No. 2281/KOLNP/2005, First Examiner's Report mailed Jan. 29, 2008, 5 pgs.
International Application Serial No. PCt/US2004/012836, International Search Report mailed Jun. 12, 2004, 5 pgs.
International Application Serial No. PCt/US2004/012836, Written Opinion mailed Jun. 12, 2004, 13 pgs.
"Australian Application No. 2004235104, Examiner Report Mailed 05-25-09", 3 pgs.

* cited by examiner

DISTRIBUTED SEARCH METHODS, ARCHITECTURES, SYSTEMS, AND SOFTWARE

RELATED APPLICATIONS

This application claims priority to U.S. Provisional Patent Application 60/465,585, which was filed on Apr. 25, 2003 which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2003, The Thomson Corporation.

TECHNICAL FIELD

Various embodiments of the present invention concern information retrieval systems and knowledge-management systems, and more particularly concern distributed search functions within such systems.

BACKGROUND

Modern computer online information providers typically require the ability to search vast quantities of data. For example, the American legal system, as well as some other legal systems around the world, rely heavily on written judicial opinions, the written pronouncements of judges, to articulate or interpret the laws governing resolution of disputes. As a consequence, judges and lawyers within our legal system are continually researching an ever expanding body of past opinions, or case law, for the ones most relevant to resolution or prevention of new disputes. Found cases are studied for relevance and are ultimately cited and discussed in documents, called work product, which, for example, advocate court action, counsel clients on likely court actions, or educate clients and lawyers on the state of the law in particular jurisdictions.

Additionally, knowledge management systems, document management systems, and other online data providers typically require information from data sets that may vary in size from large to small. Data sets in the terabyte range are no longer uncommon. For example, some systems may utilize public records comprising approximately 1.2 terabytes of unique data, and tax and accounting (TA) data that includes approximately 20 gigabytes (GB) of unique data. In previous systems, problems have occurred because the system can typically store only five percent of unique public record data. Further, the system is too big for unique TA data, which typically shares server space with other data providers.

Such variances in data set and system sizes has an impact on search-engine performance, especially related to enterprise-server implementations (including inherent availability issues). For example, if a memory fault occurs within a system's CPU, the system typically cannot run the search service until the fault is resolved, and failover mechanisms are problematic. Because the search service is typically memory-intensive and not bound to the CPU, resources are wasted resolving these fault issues.

Furthermore, at times query processing forces the search engine to access a disk for data pages if they are not available in the file system cache. While in some cases data typically can be found in the file system cache if the data set is small enough to be completely held in RAM, it is often the case that data sets are so large that query processing often occurs at the disk level rather than the file-system-cache level. Further, current architectures typically do not ensure that the same search engine will process the same data consistently, which negates search-engine caching advantages.

Accordingly, the present inventor has identified a need for better systems, tools, and methods of providing search functions within online delivery platforms.

SUMMARY

To address this and/or other needs, the present inventor has devised novel systems, methods, and software for providing a distributed search function for online delivery platforms used in law firms and other enterprises. For example, one aspect of the systems, methods and software provides a plurality of data sets. The data sets may comprise indices into other sets of data. At least one search engine is associated with each data set. A system receiving a search request determines which search engines are used to process the search request based on the data sets involved in the search request. The search request is then forwarded to the identified search engines.

Notably, the exemplary embodiment provides a search function that is distributed across multiple search engines in a way such that search data is likely to be cached in available RAM, thereby avoiding costly disk searches.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Information System

Figure 1:
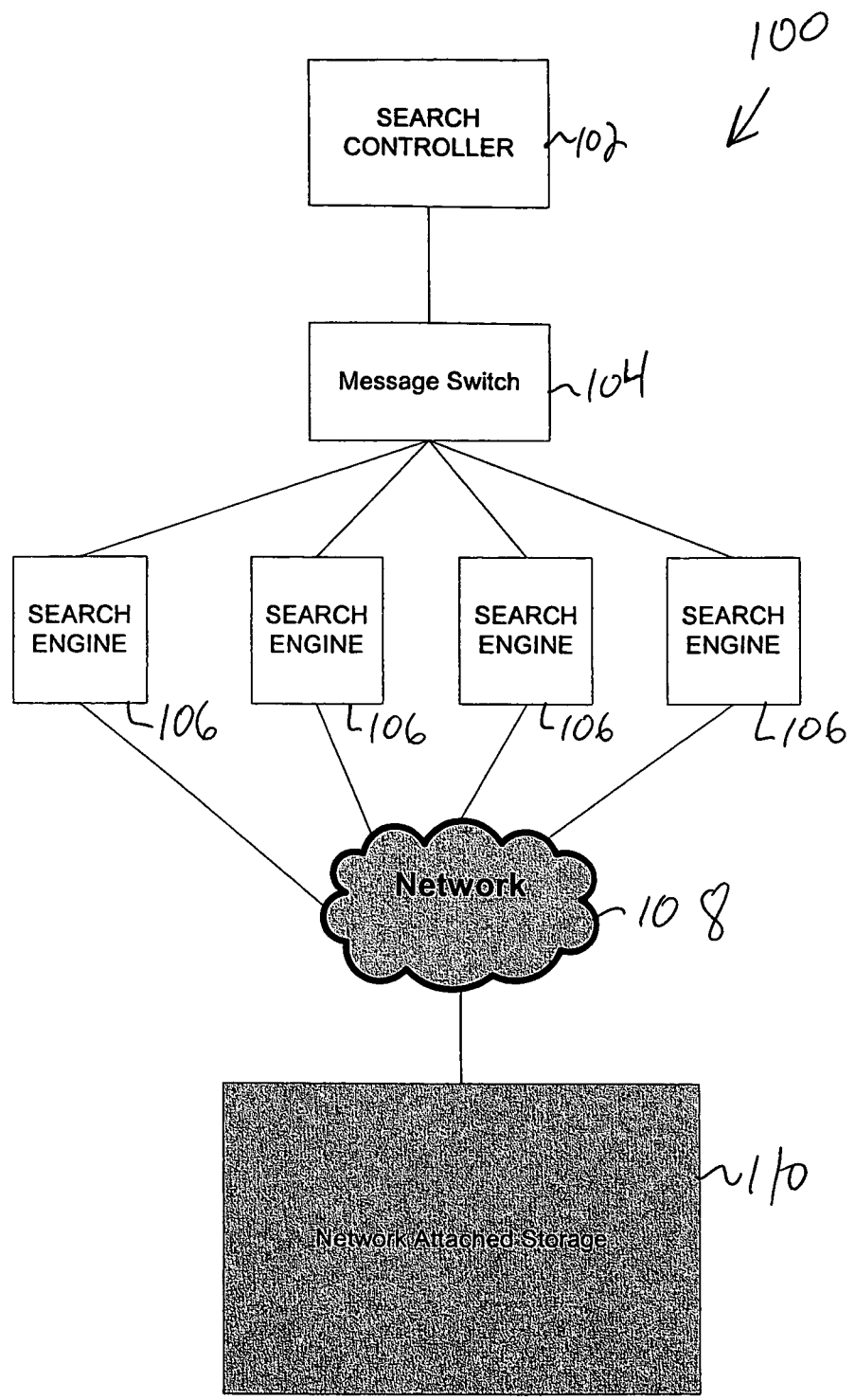
FIG. 1 is a block diagram of an exemplary distributed search system 100 corresponding to one or more embodiments of the present invention.

FIG. 1 depicts an exemplary distributed search system 100 that incorporates one or more teachings of the present invention. System 100 includes a search controller 102, a message switch 104, search engines 106, network attached storage (NAS) 110, and network 108 communicably coupling search engines 106 to NAS 110. The above-mentioned components may be distributed across one or more server computers where the servers include various processors and computer-readable storage media such as ROM, RAM, hard drives, CD-ROM drives, DVD-ROM drives and the like. In some embodiments, the server computers comprise blade based service computers from Sun Microsystems, Inc. However, in alternative embodiments, servers based on Intel processor architectures may be used.

Search controller 102 "listens" for search requests. Utilizing a "split-merge" engine, the search controller receives requests and splits them into component requests (serviced by the search engines 106). When responses are received from the search engines 106, the search controller merges the responses and sends them to the requestor. Split requests, referred to programmatically as a "SearchEngineRequest", may be made to the various data sets that comprise or are generated from the data collection or collection set. In some embodiments, the data set comprises a portion of an index (referred to as an "IndexSet") to a data collection or collection set.

Message switch 104 operates to route messages from search controller 102 to one or more search engines 106. The messages may include search requests that are to be performed by one or more search engines 106. In some embodiments of the invention, message switch 104 provides a Java Message Service (JMS) interface. Further, in some embodiments the messages may be routed using message queuing software such as the MQ messaging system available from IBM Corp. However, no embodiment of the invention is believed to be limited to a particular message routing system, and in alternative embodiments the SonicMQ message queuing software from Sonic Software Corporation may be used.

In some embodiments, search engine 106 includes a Java "wrapper" that pre- and post-processes data searched and resolved by the server. In some embodiments, this processing may be carried out through a Java Native Interface. The search engines 106 receive the SearchEngineRequest component and specific IndexSet and cause a search to be performed on the IndexSet specified with the request.

The data sets to be searched may reside on Network Attached Storage 110 that is communicably coupled to search engine 106 through network 108. Network attached storage may be any type of storage device accessible through a network. Examples of such network attached storage are known in the art and include file servers, storage servers and other network attached storage media.

Network 108 may be any type of wired or wireless network capable of supporting data communication. In some embodiments of the invention, network 108 comprises a private Gigabit Ethernet network. However no embodiment of the invention is believed to be limited to a particular network type.

Search engines 106 may run on the generic Intel systems with the Linux OS installed. Data for the IndexSets in some embodiments may be accessed through a network file system (NFS) protocol from network attached storage (NAS) server 110. As the initial query enters the search engine, the search engine is given the IndexSet name and file names necessary to satisfy the search query.

The search engine 106 may make NFS calls to the NAS server 110 and request data for those files. This data is typically static and is cached on the NFS client system. Subsequently, when the search engine accesses data for its assigned IndexSet, it may make a meta-directory call to the NFS server for file information. The search engine 106 reads the data pages from the local RAM cache, which allows a RAM-speed search of query terms.

Figure 2:
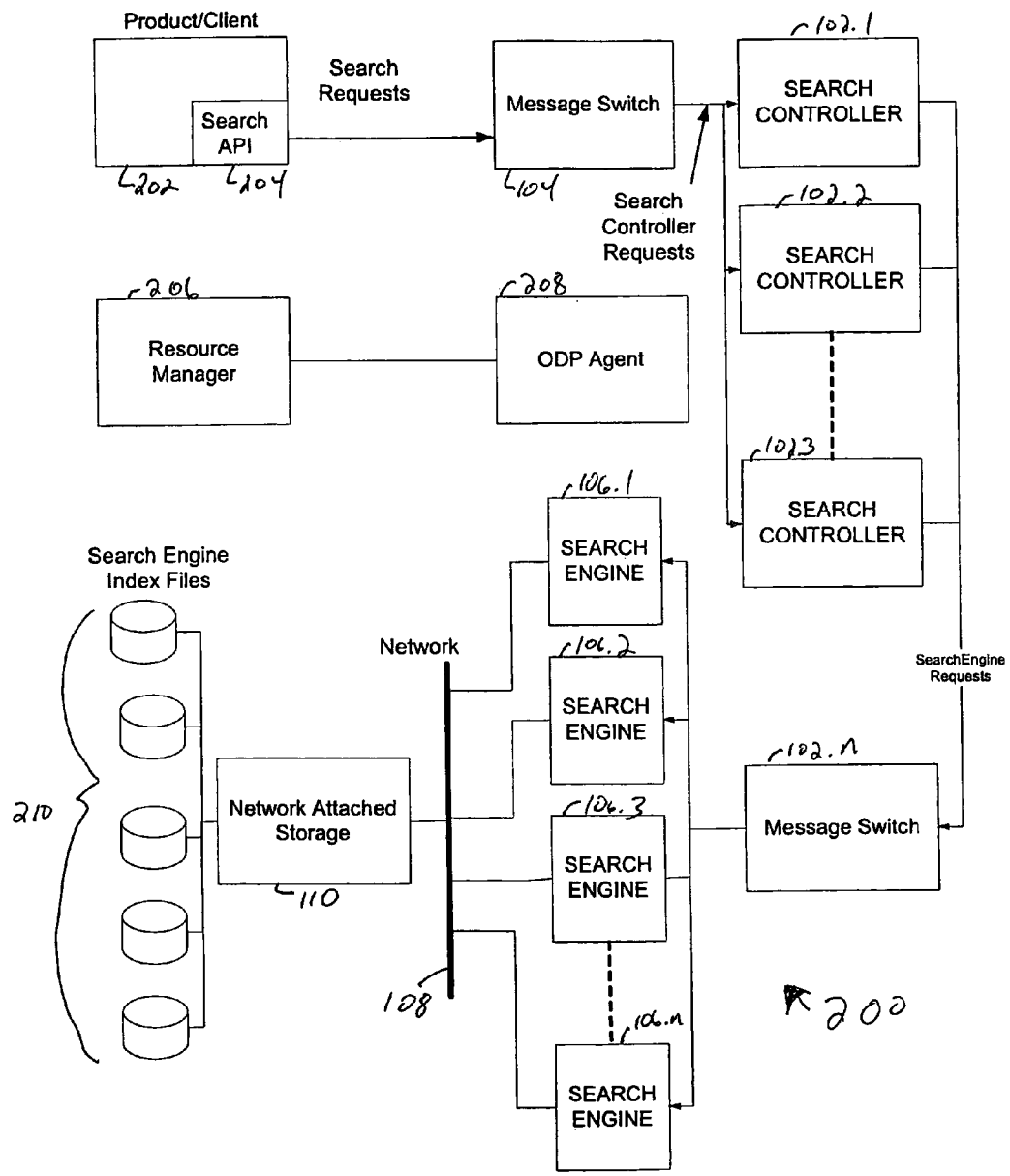
FIG. 2 is a block diagram providing further details of an exemplary distributed search system 200 corresponding to one or more embodiments of the present invention.

FIG. 2 provides further details of an exemplary distributed search system 200 that incorporates one or more teachings of the present invention. System 200 includes the components described above with reference to FIG. 1, and in addition includes product/client 202, resource manager 206, and Online Delivery Platform agent 208.

Product/client 202 may be any client software module that uses the distributed search functionality provided according to the teachings the embodiments of the invention. Such software includes browsers, document management systems, knowledge management system, document retrieval systems, case law retrieval systems and the like. Product/client 202 issues one or more search requests to a message switch 104, which routes the requests to a service controller based on data in the search request.

Online Delivery Platform (ODP) agent process 208 starts processes on a server such as search controllers 102 and search engines 106 and monitors and manages these processes. In some embodiments, ODP agent process 208 also keeps track of the individual process and reports on their processing status to a bulletin board database. Further, in some embodiments, ODP agent process 208 restarts the search controllers or search engines when there are faults or "long transaction" criteria. The ODP agent 208 is considered the hosting agent process that runs the ODP environments.

When the system boots, the ODP agent 208 on the server starts and queries a (preconfigured) Resource Manager 206 for engines that allocate the ODP agent 208 to an Agent Manager (not shown). The Agent Manager contains information about agents and search engines in a domain and can assign workloads dynamically to ODP Agents 208 that query it. In some embodiments, the Agent Manager comprises an LDAP (Lightweight Directory Access Protocol) agent. In some embodiments, search engines are assigned message queues with names that correspond to the names of the IndexSet associated with the search engine 106.

In some embodiments, if a search engine 106 fails, its agent will detect the failed engine and restart it. The query processed at the time of the search-engine failure may be lost and the controller request is "errored" out. (Some embodiments may transfer a copy of the failed query to another search engine operating on the subject index set.) However, the failed search engine 106 may be restarted so that new queries can be processed without delay.

In some embodiments, if the search engine system encounters a CPU, RAM, or other hardware failure, a message switch agent detects that the IndexSet queue has no processes servicing it. The agent immediately alerts the Agent Manager to reassign search engines to service that IndexSet queue.

The exemplary system design of various embodiments incorporates deploying generic systems with a fixed OS image that "learns" its role in the distributed search architecture during the boot process. The system's resiliency accommodates process or hardware failure, and its flexibility allows the allocation of additional resources for failed components.

Further, in some embodiments, additional resources allocated for failover are not "idle" (waiting for failover). They can be deployed as "workload handlers," providing additional processing if processing bottlenecks are detected. This workload can be detected through the message switch 104 or ODP agent 208, which can detect and report on workload patterns of each IndexSet queue.

Additionally, the exemplary architecture of various embodiments is conducive to a "lazy-monitoring" scheme. No component failures need to be detected and fixed immediately. Detection and notification can happen when catastrophic events occur, but fixing components can take place any time, as long as there are additional resources available to assume their workload.

Exemplary Method of Operation

Figure 3:
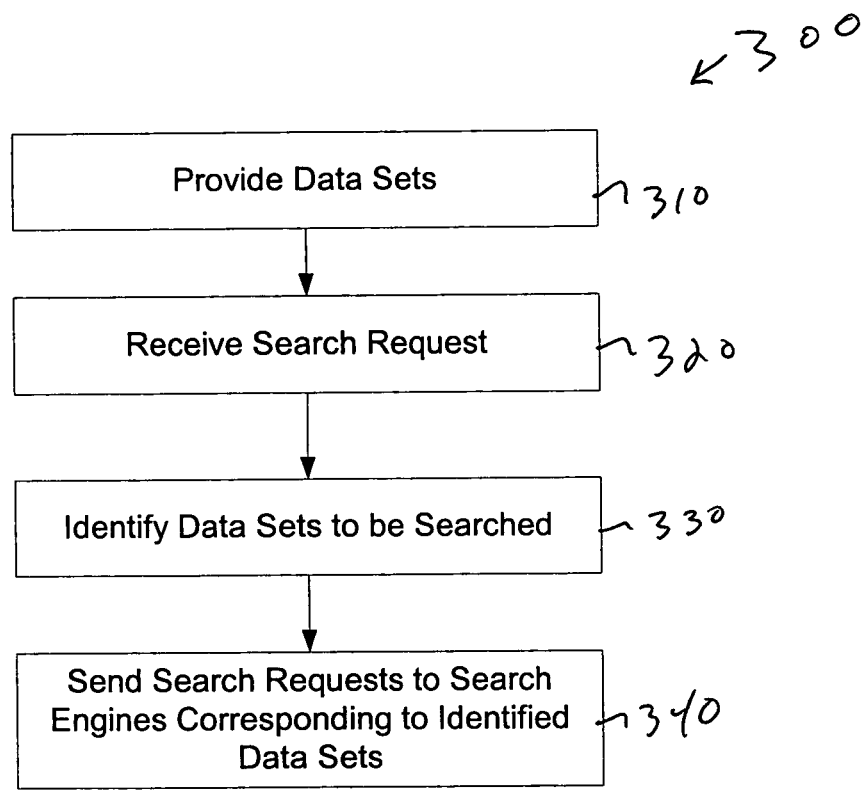
FIG. 3 is a flow chart corresponding to one or more exemplary methods of operating an exemplary distributed search system and associated components that embody the present invention.

FIG. 3 shows a flow chart 300 of one or more exemplary methods of operating an information-management system, such as system 100. Flow chart 300 includes blocks 310-340, which are arranged and described in a serial execution sequence in the exemplary embodiment. However, other embodiments may execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

At block 310, the exemplary method begins with providing one or more data sets. In some embodiments, the data sets comprise portions of an index to a data collection or set of data collections. The index may be divided based on ranges of database indices, with each range comprising a data set. The data sets are then stored on a storage device such as NAS 110.

Block 320 entails receiving a search request. At block 330, the search request is analyzed to determine which data sets are required.

At block 340, Search requests are then forwarded the search engines that correspond to the data sets identified at block 330. In some embodiments of the invention, search requests are forwarded to search engines through message queues. Further, in some embodiments, the message queue associated with a particular search engine is given the same name as the IndexSet that is configured for the search engine.

CONCLUSION

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

What is claimed is:

1. An online searching system comprising:
   a plurality of processors and computer-readable media;
   a plurality of data sets, the data sets having an associated index set;
   a plurality of search engines executable on one or more of the plurality of processors from the computer-readable media; and
   an online data platform agent executable on at least one of the plurality of processors from a computer-readable medium and operable to:
   receive configuration data and to associate data sets of the plurality of data sets with one or more of the plurality of search engines, and
   upon detection of a search engine failure, reassociate a data set associated with the failed search engine with one or more of the plurality of search engines and copy a query executing on the failed search engine to a search engine of the one or more of the plurality of search engines.

2. The system of claim 1, further comprising a plurality of servers, wherein each server hosts at least one of the search engines.

3. The system of claim 2, wherein each server includes one or more of the plurality of processors and an associated Linux operating system.

4. The system of claim 1, further comprising a plurality of search controllers operable to distribute search requests to the plurality of search engines.

5. The system of claim 4, further comprising a message service operable to route search requests between the plurality of search controllers and the plurality of search engines.

6. The system of claim 5, wherein the message service includes a JAVA Message Service.

7. The system of claim 5, wherein search requests are routed to a message queue.

8. The system of claim 7, wherein the message queue is provided by a version of the IBM/MQ message queue software.

9. The system of claim 5, wherein the message service is operable to detect workload patterns for the plurality of search engines and to allocate one or more of the plurality of search engines to a data set in response to detecting a bottleneck in processing for a data set.

10. The system of claim 1, wherein each of the data sets comprises a portion of an index to a data collection.

11. The system of claim 1, wherein the online data platform agent is further operable to detect workload patterns for the plurality of search engines and to allocate one or more of the plurality of search engines to a data set in response to detecting a bottleneck in processing for the data set.

12. A method for performing a search, the method comprising:
   providing a plurality of data sets;
   associating data sets of the plurality of data sets with one or more of the plurality of search engines;
   receiving a search request;
   identifying at least one data set of the plurality of data sets to be searched in response to the search request;
   sending the search request to at least one search engine of a plurality of search engines, said search engine having an association with the at least one data set;
   reassociating a data set with one or more of the plurality of search engines upon detection of a search engine failure; and
   copying a query executing on the failed search engine to a search engine of the one or more of the plurality of search engines reassociated with the data set.

13. The method of claim 12, wherein the data set comprises a portion of an index for a data collection.

14. The method of claim 12, wherein sending the search request comprises placing the search request in a message queue.

15. The method of claim 14, wherein an identifier associated with the message queue is the same as an identifier associated with the data set.

16. The method of claim 12, further comprising splitting the search request for sending to a plurality of the search engines.

17. The method of claim 12, and further comprising detecting workload patterns for the plurality of search engines and allocating one or more of the plurality of search engines to a data set in response to detecting a bottleneck in processing for the data set.

18. A non-transitory computer-readable storage medium having stored thereon instructions for executing a method for performing a search, the method comprising:

providing a plurality of data sets;

associating data sets of the plurality of data sets with one or more of the plurality of search engines;

receiving a search request;

identifying at least one data set of the plurality of data sets to be searched in response to the search request;

sending the search request to at least one search engine of a plurality of search engines, said search engine having an association with the at least one data set;

reassociating a data set with one or more of the plurality of search engines upon detection of a search engine failure; and copying a query executing on the failed search engine to a search engine of the one or more of the plurality of search engines reassociated with the data set.

19. The non-transitory computer-readable storage medium of claim 18, wherein the data set comprises a portion of an index for a data collection.

20. The non-transitory computer-readable storage medium of claim 18, wherein sending the search request comprises placing the search request in a message queue.

21. The non-transitory computer-readable storage medium of claim 20, wherein an identifier associated with the message queue is the same as an identifier associated with the data set.

22. The non-transitory computer-readable storage medium of claim 18, wherein the method further comprises splitting the search request for sending to a plurality of the search engines.

23. A system for performing a search, the system comprising:

a plurality of processors and computer-readable media;

means for providing a plurality of data sets;

means for associating data sets of the plurality of data sets with one or more of a plurality of search engines executable by one or more of the plurality of processors from the computer-readable media;

means for receiving a search request;

means for identifying at least one data set of the plurality of data sets to be searched in response to the search request;

means for sending the search request to at least one search engine of a plurality of search engines, said search engine having an association with the at least one data set; and means for reassociating a data set with one or more of the plurality of search engines upon detection of a search engine failure and copying a query executing on the failed search engine to a search engine of the one or more of the plurality of search engines reassociated with the data set.

24. The system of claim 23, wherein the data set comprises a portion of an index for a data collection.

25. The system of claim 23, wherein the means for sending the search request includes placing the search request in a message queue.

26. The system of claim 25, wherein an identifier associated with the message queue is the same as an identifier associated with the data set.

27. The system of claim 23, further comprising means for splitting the search request for sending to a plurality of the search engines.

* * * * *